Sept. 24, 1929.  H. W. SLAUSON  1,729,135
AIR AND OIL FILTER
Filed Dec. 23, 1925  3 Sheets-Sheet 1
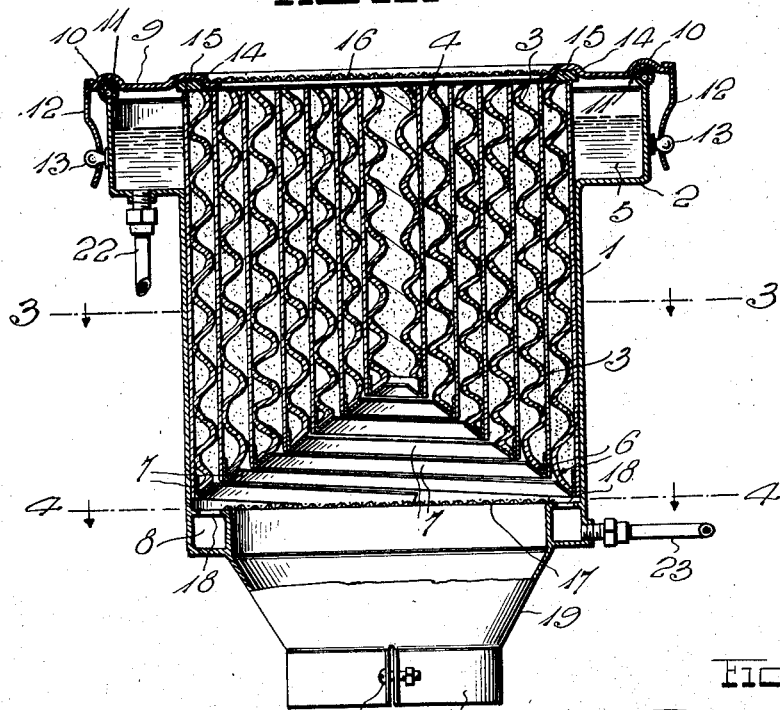
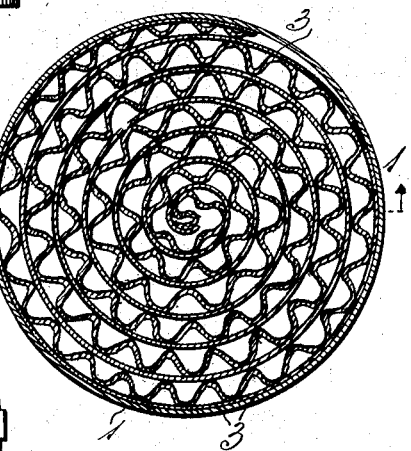
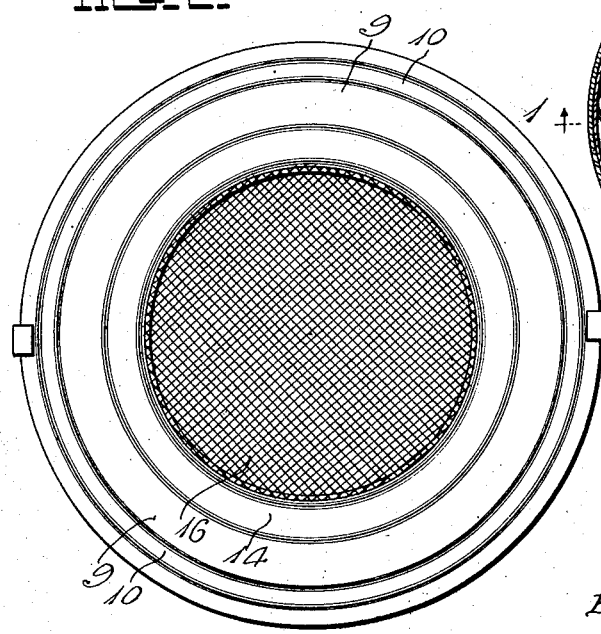
Inventor
H. W. Slauson
By Gordon & Stewart
Attorneys

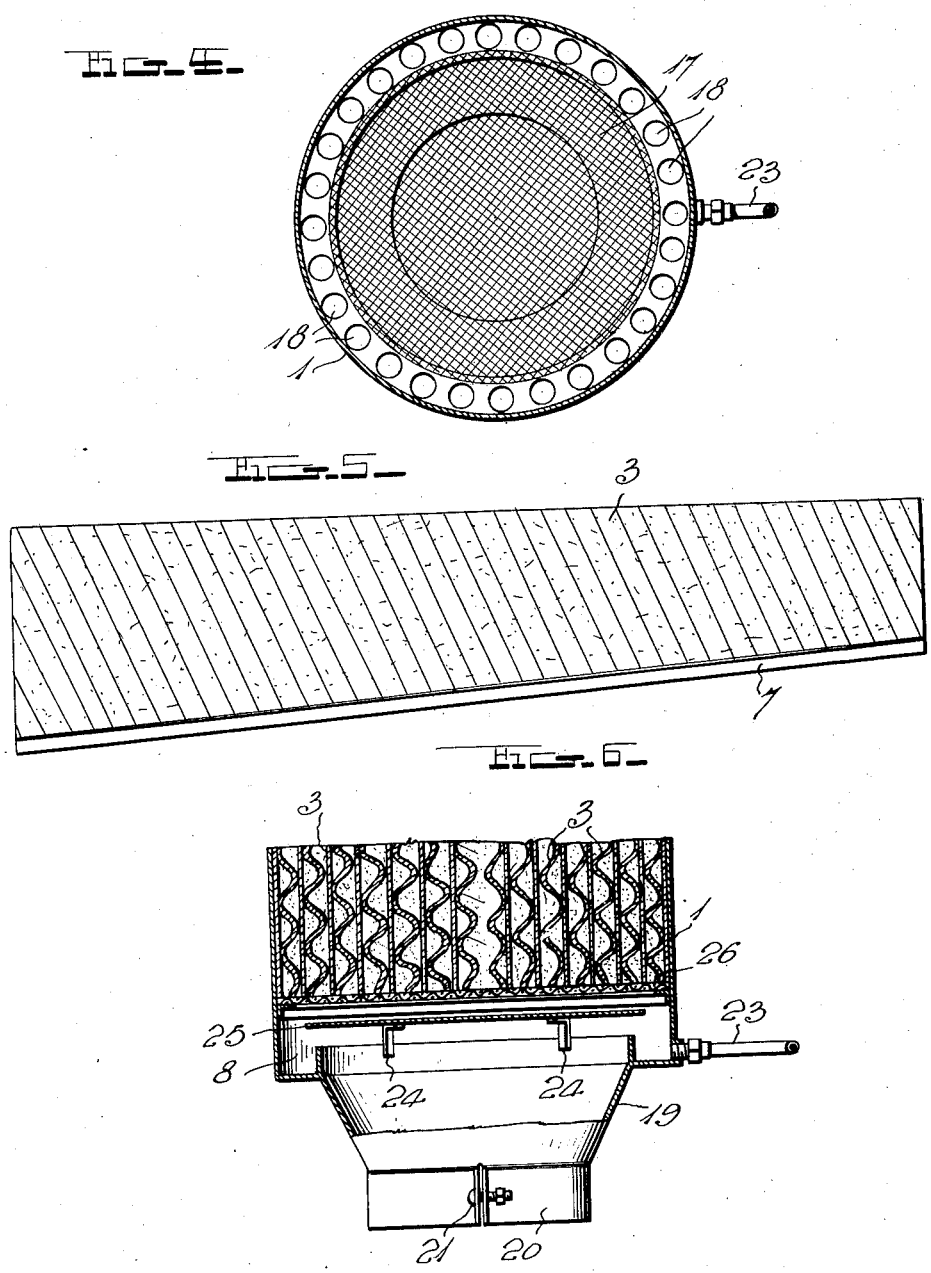

Sept. 24, 1929. H. W. SLAUSON 1,729,135
AIR AND OIL FILTER
Filed Dec. 23, 1925  3 Sheets-Sheet 3
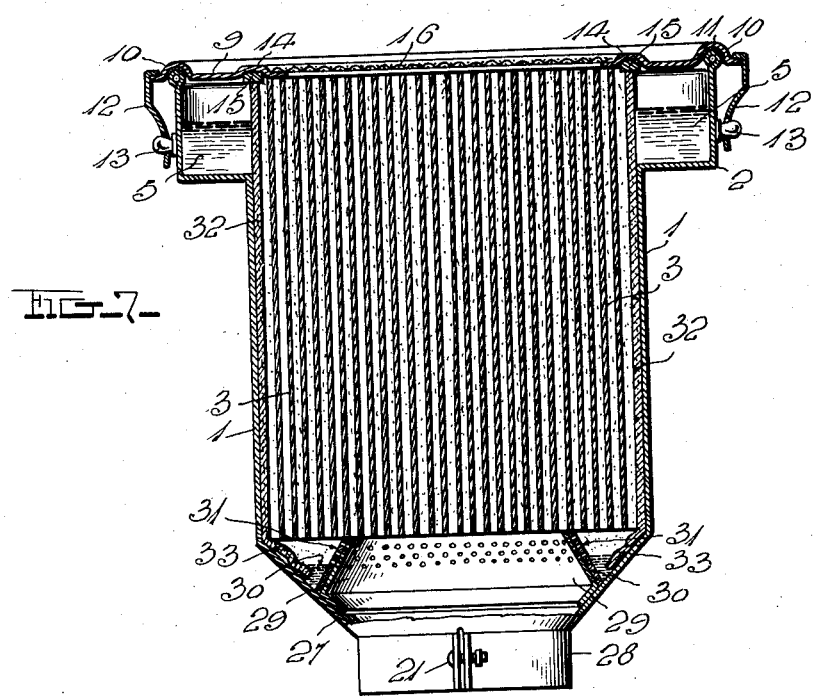
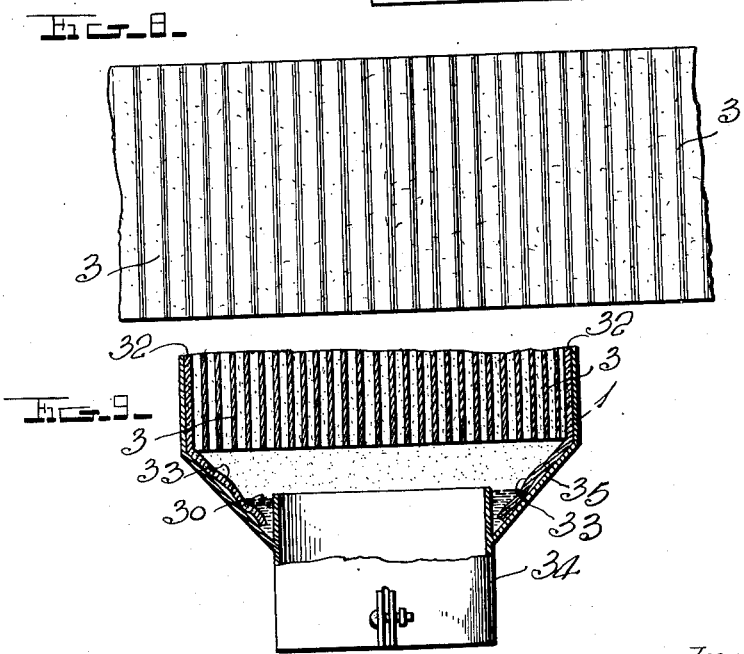
Inventor
H. W. Slauson
By Gordon & Stewart
Attorneys Patented Sept. 24, 1929

1,729,135

UNITED STATES PATENT OFFICE

HAROLD W. SLAUSON, OF NEW YORK, N. Y.

AIR AND OIL FILTER

Application filed December 23, 1925. Serial No. 77,173.

The present invention relates to improvements in cleaning or filtering devices for use in connection with internal combustion engines, air compressors and other devices of a similar nature wherein a substantial volume of air or other gas is drawn into the device, and in which it is particularly advisable to prevent the entrance along with such air or gas, of dust and other foreign material, particularly such as may be of an abrasive character. It also relates to a structure in which the lubricant used in connection with internal combustion engines, air compressors and the like may be suitably cleansed of impurities, of both a solid and volatile character.

More particularly my invention relates to that type of air cleaner or filter which employs a filtering medium disposed in the air or gas streams.

It is one of the objects of the present invention to provide a filtering or air cleaning structure which will offer a minimum resistance to the passage of air or other gas through the cleaner.

It is a further object of the present invention to enhance the effectiveness of the filtering medium by the utilization of an oleaginous material, for the surface over which the air stream passes.

It is a further object of my invention to provide a filtering structure in which the filtering medium is readily removable for cleaning or replacement.

It is a still further object of my invention to provide a filtering structure in which the filtering medium presents an oleaginous surface to the air or gas stream and at the same time acts as a capillary filter for a body of oil.

Referring now to the drawings which illustrate a few of the forms my invention may take, Figure 1 is a cross sectional view of a specific embodiment of my invention;

Fig. 2 is a top view of the same;

Fig. 3 is a sectional view of the same along section lines 3—3 of Fig. 1;

Fig. 4 is a cross section of the structure shown in Fig. 1 taken along the sectional lines 4—4 of the same;

Fig. 5 is a view of the filtering material as used in the specific embodiment shown in Figs. 1 to 4 inclusive;

Fig. 6 is a sectional view of the lower end of a modified form of filter;

Fig. 7 is a cross sectional view of another specific embodiment of my filtering structure;

Fig. 8 is a view of the filtering material as used in the form of my invention illustrated in Fig. 7;

Fig. 9 is a partial view in section of a modified form of my filter.

Referring now to the specific embodiment of my invention as disclosed in Figs. 1 to 5 inclusive, the same consists of a cylindrical shell 1 formed in any convenient manner out of suitable material such as sheet steel or copper etc., the same having an enlarged cylindrical portion 2 at its upper end. In the form of structure shown the enlarged portion 2 which forms an annular oil reservoir is made by expanding the cylindrical side wall, but if desirable the side wall 1 could be extended straight up and a separate enlarged annular chamber could then be added to the upper portion. If constructed in this manner suitable perforations would be placed in the upper extension of the side walls in order that any oil or oleaginous material could reach the filtering material in the interior of the structure. This filtering material 3 is formed of a rolled-up corrugated strip of wool felt, cotton, unsized corrugated cardboard, corrugated asbestos, fiber board or similar material. In the form shown in Figs. 1–6 inclusive, this material is formed with hollow corrugations or ridges which gives a very large cross sectional area for the air intake and consequently reduces the speed of the air through the filtering passages. As shown in Fig. 5 the corrugations run in a diagonal direction although they may be of any suitable form such as a spiral, zig-zag, S-shaped or straight across as is illustrated in Fig. 8 of the drawings. The strip of filtering material as shown in Fig. 5 is closely rolled up to make a tight cylindrical filling for the filtering receptacle or shell 1. The annular space 5 formed by the expanded portion of the shell 2 is adapted to be filled with a sufficient quantity of fresh or used lubricating oil or other oleaginous medium. This is in contact with the filtering medium and flows to all parts of the filtering material by virtue of capillary action, which by virtue of the oleaginous surface formed will entrain dust and other foreign particles in the air stream.

In the form shown in Fig. 6 the lower edge of the filtering material is cut on a bias as is illustrated in Fig. 5. When placed in position in the shell 1 the diagonal rolled edge 6 of the filtering material registers with a spiral flexible metal trough 7. This flexible trough, which can be fluted if desired to accommodate the corrugations on the lower edge of the filtering material, functions to collect the excess oil which flows down the filtering material under capillary action thereby preventing it from passing with the air to the carburetor and delivering it instead into a bottom annular oil receiving trough or chamber 8.

A lid 9 is provided for the top of the filter or cleaner, this lid being somewhat larger in diameter than the oil reservoir 5 and having a groove or depression 10 adapted to carry a packing washer or gasket 11 of cork or other material not affected by oil which will render the cover oil tight when clamped in place by means of a hinged spring or flat clamps 12 snapping over the buttons or projections 13 extending from the reservoir exterior surface 2. A secondary groove 14 may be provided in the cover member to accommodate a second and smaller gasket 15 resting against the top edges of the filtering material. A central circular opening through the lid is provided with a screen 16. A secondary screen 17 is provided at the bottom of the cleaning structure to prevent any loose material from being drawn into the carburetor and engine. Arranged around the periphery of the bottom screen member 17 are a plurality of openings 18 through which the oil may drain into the lower oil trough 8.

The truncated bottom 19 of the air cleaning device is provided with a split portion 20 and a nut and screw 21 by means of which attachment of the device is made to the carburetor or air intake pipe leading to the engine or similar device.

In certain uses of the device above described an oil feed pipe 22 is provided for the annular oil chamber 5, which pipe may be connected to an oil pump, the main reservoir of the engine or a small auxiliary storage tank. A flow of oil from the engine to the chamber 5 might also be obtained by means of the exhaust pressure or inlet suction. An exit oil pipe 23 is also provided in communication with the bottom oil reservoir 8 whereby oil may be led therefrom back to the oil circulating system of the engine.

Therefore by connecting pipes 22 and 23 into the oil circulation system of the engine, in any suitable manner, the oil used therein is subjected to a capillary filtering process in its passage from the upper annular oil trough 5 to the lower annular oil trough 8, the filtering material catching and holding any particles of solid matter suspended in the oil, at the same time volatile products present in the oil such as any condensed gasoline which may have reached the crank case of the engine will be evaporated from the relatively large surface of the filtering material and will therefore enter the engine in the form of fuel.

In Fig. 6 a modified structure at the bottom of the device is illustrated. In the form of specific embodiment here shown the truncated bottom portion 19 of the shell instead of being provided with a screen has a plurality of supports 24 supporting a horizontal baffle plate 25 of slightly larger diameter than the interior of the upper end of the truncated portion 19. A bottom screen 26 is located a short distance above this baffle plate, the lower end of the filtering material resting upon this screen.

In the specific embodiment herein shown the lower edge of the filtering material is not cut on a bias but is straight and parallel with the upper end.

Any oil falling from the lower end of the filtering material strikes against the baffle plate 25 and is carried to its outer edge by virtue of the air stream passing across the surface. From the outer edge the oil drops into the annular oil reservoir 8 whereas the air passes into the interior of the lower truncated portion 19 and thence to the carburetor and the engine.

In the modification shown in Fig. 7 the shell 1 is formed into an oil reservoir 5 in the manner hereinbefore described in connection with Fig. 1 and a lid 9 having the screen member 16 and oil packing groove 10 and 14 is provided, as has already been described in connection with Fig. 1. The bottom portion 27 of the structure is truncated from the exterior diameter of the device to the fitting portion 28 adapted to make connection with the carburetor. Located in the interior of this truncated portion is a truncated cone 29 soldered, brazed, riveted or otherwise suitably fixed to the interior surface of the portion 27 of the exterior shell. The interior cone shaped member 29 therefore forms in combination with the truncated portion of the exterior shell an annular V-shaped bottom oil trough 30.

The outer surface of the interior cone member 29 is preferably covered with felt 31 on its outer surface and the felt and cone are both perforated to permit the passage of the filtered air which may reach the oil trough 30 through the channel in the outer circumference of the filtering element.

In the form of structure disclosed in Fig. 7 which is constructed for the filtering of air or gas alone, the filtering element 3 has straight or perpendicular corrugations, as shown in Fig. 8 and when formed into a tightly rolled mass, is surrounded by a layer or layers of felt 32 on its outer surface. This outer felt cover of the filtering material has a projecting portion 33 which forms a skirt which projects down into the oil chamber 30. Excess oil from the top chamber 5 passes down the felt covering 32 by capillary action until this becomes thoroughly saturated, the oil then saturating the filtering element 3. The layer of felt 31 on the inner cone 29 also becomes saturated.

If necessary a draw-off cock could be added to the lower oil chamber or trough 30 in order to draw off excess oil.

A slightly different modification of the bottom portion of the structure just described is shown in Fig. 9. In this modification the split sleeve portion 34 is extended up into the inner truncated portion 35 of the shell 1 forming an oil chamber or trough 30 into which the projecting end 33 of the felt envelope or covering extends.

The operation of the structures described will be clear. In each instance the lower split portion is applied to the air intake of the engine or similar device and the air or gas which is drawn through the cylinder will have the dust or other foreign substances caught by the oleaginous surface of the filter medium.

When the form of the structure utilized is that in which the oil is supplied to the upper oil chamber from the engine, the oil as it travels by capillary action from the upper oil chamber to the lower oil chamber undergoes filtration and may be returned to the engine or drawn into a suitable storage reservoir.

In all of the various embodiments of the structure described, the cross sectional area of the air passages through the filter is considerably greater than the cross sectional area of the carburetor air intake, and consequently the speed of this air through the filtering passages is correspondingly reduced, thus causing the air to give up its impurities more readily to the oil impregnated filtering material. This is especially true in the use of filtering material possessing hollow corrugations, although it is to be understood that my invention is not limited to the use of hollow corrugated filtering material, as it may find embodiment in filtering material possessing solid corrugations.

The scope of my invention is of course not limited to the specific embodiments herein described as the same may take any form within the scope of the appended claims.

What I claim is:

1. In a filtering device an outer cylindrical shell, an annular recess formed at the upper end of said shell and having its top edge in the same plane as the top edge of said cylindrical shell, a second annular recess formed at the lower end of said shell, an involuted porous filtering medium contained within said outer cylindrical shell with its upper end adjacent said first annular recess and its lower end adjacent said second annular recess, and a removable top cover for said device adapted to cover both said cylindrical shell and said first annular recess, and having a circular screened opening positioned above said filtering medium.

2. In a filtering device, an outer cylindrical shell, an annular recess formed at the upper end of said shell and having its top edge in the same plane as the top edge of said cylindrical shell, a second annular recess formed at the lower end of said shell, an involuted porous filtering medium contained within said outer cylindrical shell with its upper end adjacent said first annular recess and its lower end adjacent said second annular recess, a removable top cover for said device adapted to cover both said cylindrical shell and said first annular recess, said cover having a circular opening positioned above said filtering medium, means for supplying oleaginous fluid to said first annular recess, and means for withdrawing oleaginous fluid from said second annular recess.

3. In a filtering device, a cylindrical shell, an upper annular recess formed at the upper end of said shell, a truncated bottom shell portion, a cylindrical member within said truncated bottom portion extending upwardly to form an annular recess within said truncated bottom shell portion, and an involuted porous filtering medium having its upper end adjacent said upper annular recess and its lower end adjacent said annular recess formed within said truncated bottom shell portion.

In testimony whereof, I have hereunto affixed my signature.

HAROLD W. SLAUSON.